April 14, 1959     W. W. RODGERS     2,881,457
LOADING DOCK RAMP
Filed Aug. 11, 1953     2 Sheets-Sheet 1
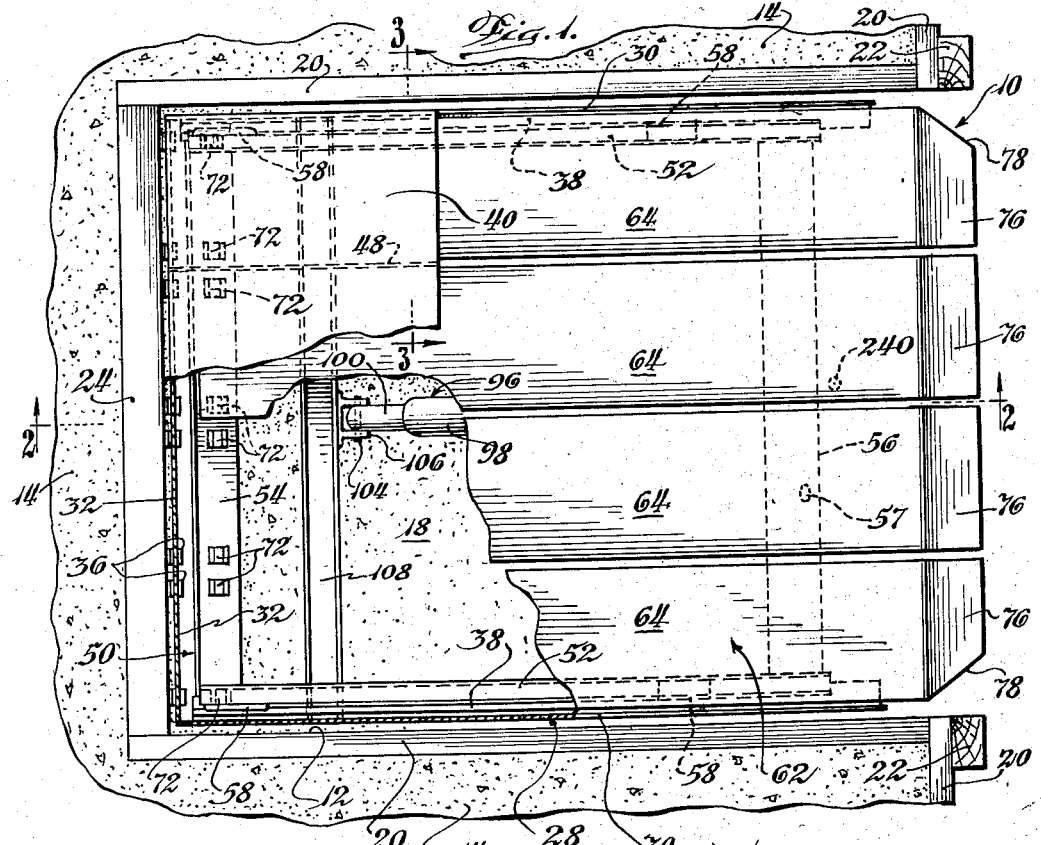
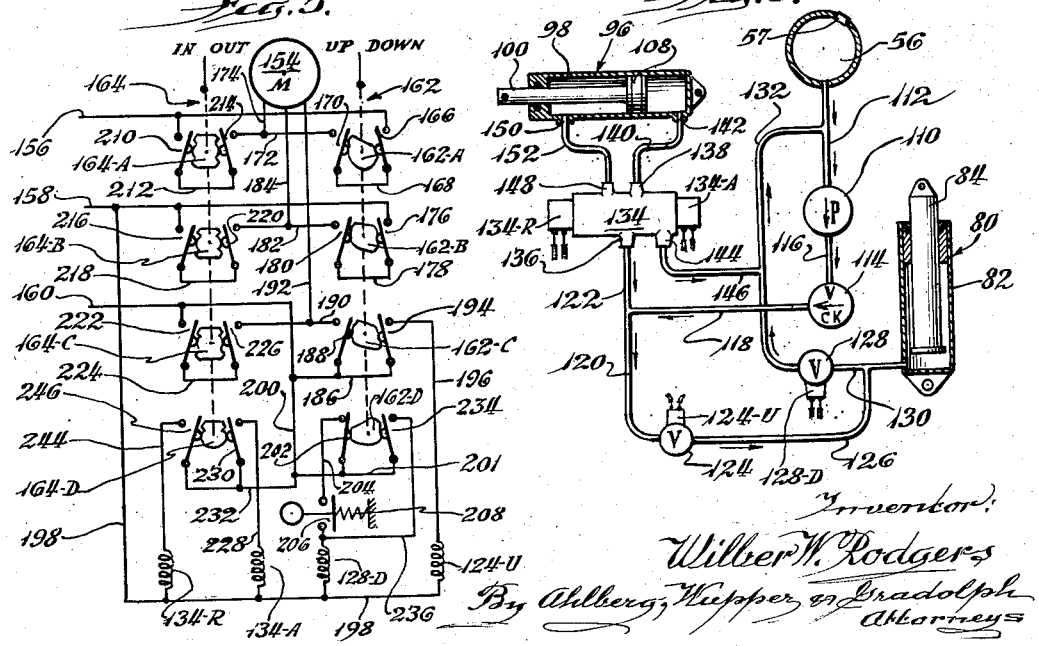

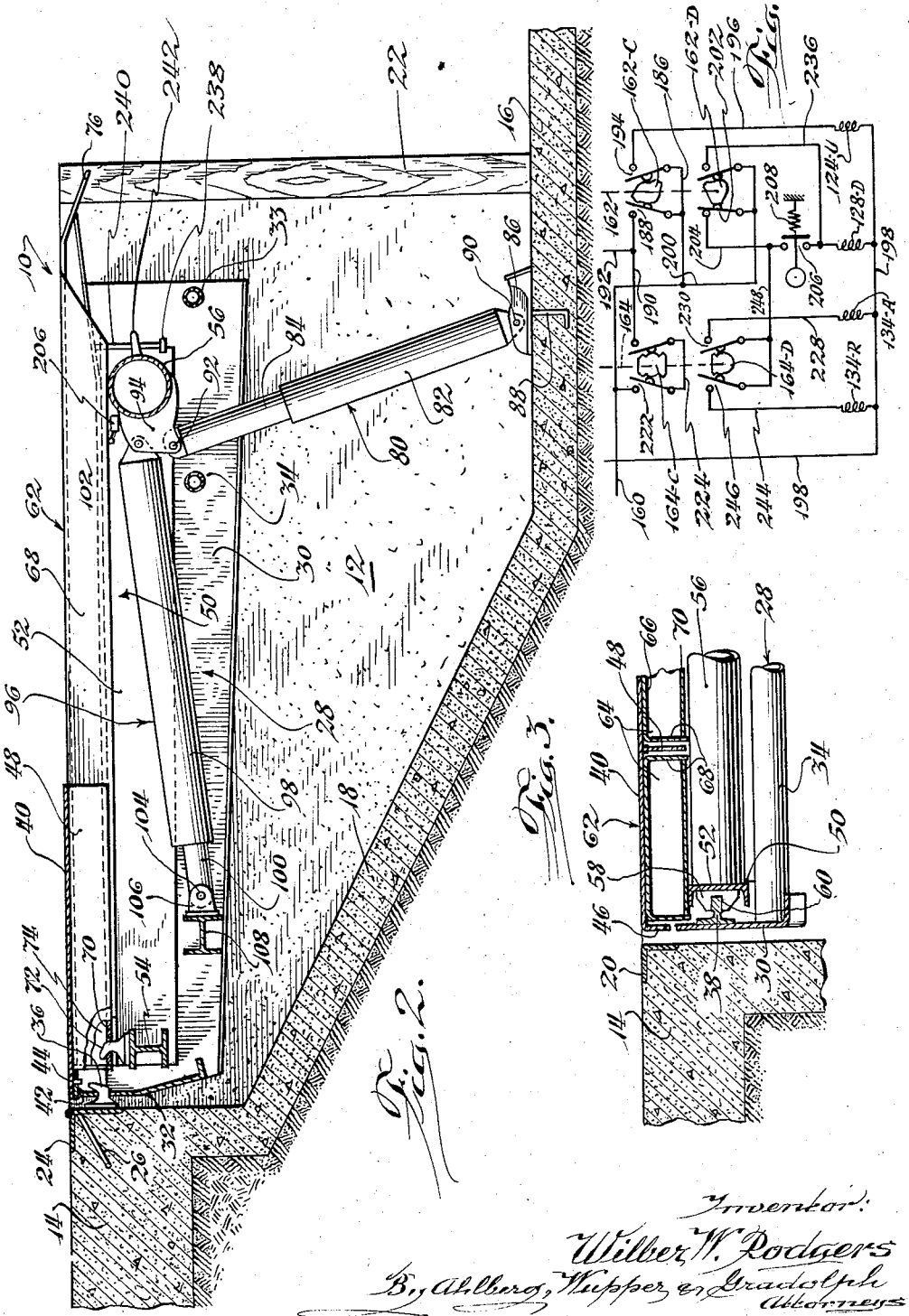

United States Patent Office 2,881,457
Patented Apr. 14, 1959

2,881,457

LOADING DOCK RAMP

Wilber W. Rodgers, Memphis, Tenn., assignor to Dover Corporation, a corporation of Delaware Application August 11, 1953, Serial No. 373,613

6 Claims. (Cl. 14—71)

The present invention relates to improvements in loading dock ramps which are adapted to bridge between a fixed dock or platform and the bed of a freight carrier such as a truck, trailer, or the like.

Loading docks are intended to facilitate the use of wheeled or motorized handling equipment in loading and unloading trucks and trailers backed up to a dock which is approximately the same height above the ground or the roadway as the bed of the truck. It is known, however, that truck bed heights may vary by as much as a foot or more, and many trucks are equipped with unusually constructed rear sills, such as those having doors and walls insulated for refrigeration purposes. Also some trucks have only side access openings. In such cases it is difficult to obtain access to the truck with a wheeled dolly or a motorized freight handling vehicle. This is even true of those places where there are permanently installed dock boards or dock lifts which have one end mounted to the stationary portion of the dock and the other end supported by some adjustable means such as a hydraulic jack so that the outer end of the ramp may be raised and lowered as the conditions require.

The loading docks which are now in commercial use possess two disadvantages. The first is that outer end of the dock board which rests on the truck bed does not follow the deflection of the truck springs or the tilting of the truck body transversely while the truck is being loaded and unloaded. Secondly, these dock boards are not arranged so that a truck having particular sill arrangements, doors, or side openings, can be bridged by the dock board because the outer end thereof cannot reach the bed of the truck because of interference from the truck doors or the inability to bring the truck opening toward the dock board which is the case with a truck having a side opening.

The loading dock ramp of the present invention has a dock board, ramp or deck capable of what might be termed universal movement; that is, it may be moved inwardly and outwardly, or toward and away from the fixed portion of the dock, and may move freely up and down with the deflection of the truck springs and movement of the truck bed during the loading and unloading of the truck.

It is, therefore, a principal object of the present invention to provide a new and improved loading dock ramp which may be used with all types and styles of trucks, and wherein the outer ends of the movable deck may be moved toward and away from the truck bed and will move vertically with the truck bed regardless of the deflection of the springs in order to provide a substantially smooth path for wheeled vehicles.

Another object is to provide a new and improved loading dock ramp which is easily positioned to any height and position of truck or trailer bed.

A further object is to provide a new and improved loading dock ramp which, when in use, has its outer end supported solely by the truck bed.

A further object is to provide a new and improved loading dock ramp having the foregoing characteristics which, when moved to a position flush with the stationary dock, becomes a part thereof and carries all of the normal traffic in a transverse direction.

A further object is to provide a new and improved loading dock ramp having a subframe which is movable pivotally with respect to the stationary dock and in and out with respect thereto and which incorporates a torque tube or a torsion resisting member also serving as the reservoir for the hydraulic operating fluid.

A further object is to provide a new and improved loading dock ramp which may be moved vertically and horizontally to bridge the space between a stationary dock and the bed of a truck.

And a further object is to provide a new and improved loading dock ramp having the characteristic described in the preceding paragraphs wherein the vertical and horizontal movements may be combined and effected simultaneously or wherein control means are provided to permit either vertical movement or horizontal movement.

Other objects and advantages will become apparent from the following description taken in conjunction with the accompanying drawings, wherein:

Fig. 1 is a plan view of the loading dock ramp forming the subject matter of this invention, having parts broken away better to illustrate the frame construction and some of the dock components which are below the deck;

Fig. 2 is a longitudinal cross sectional view taken substantially along the line 2—2 of Fig. 1 looking in the direction of the arrows;

Fig. 3 is a fragmentary cross sectional view taken substantially along the line 3—3 of Fig. 1 looking in the direction of the arrows;

Fig. 4 is a diagrammatic view of the hydraulic system for operating the loading dock ramp of the present invention;

Fig. 5 is a schematic wiring diagram of the electrical portion of the control for the loading dock ramp of this invention; and Fig. 6 is a wiring diagram illustrating a part of the electrical control to be used when vertical and horizontal ramp movements are not to be effected simultaneously.

The loading dock ramp constituting the present invention is indicated in its entirety by the reference character 10 and is preferably mounted within a pit 12 in a permanent or stationary dock 14. The pit 12 is deepest at its outer end, that is, the end adjacent the pavement or roadway 16, and has a sloping base 18 which minimizes the amount of excavation required. The upper corners of the dock structure 14 at its outer face and at the sides of the pit 12 are protected by angles 20, and the front of the dock on either side of the pit opening is protected by vertical wooden bumpers 22. At the rear or inner end of the pit 12 a structural angle member 24 is anchored in the concrete of the dock or platform 14 by conventional reinforcing 26.

The dock ramp 10 includes a first or outer generally rectangular frame 28 comprising a pair of angle-shaped side members 30 which are deeper at their outer ends than at their inner ends so that when the frame 28 is pivoted upwardly the lower edges of the side members will not be lifted above the top of the platform 14. The side members are interconnected at their inner ends by a flanged plate 32 which is welded to the inner faces of the side members; these members are also secured adjacent their outer ends by a pair of tubular members 33 and 34 welded to the inner faces thereof. The frame 28 is pivotally mounted to the fixed support or angle member 24 by a plurality of hinge members 36 extending through slots in the back plate 32, the hinge members 36 being welded to the outer face of the angle 24 as shown in Fig. 2. The particular hinge structure is more fully disclosed and claimed in the copending application of Lawrence F. Jaseph, Serial No. 342,606, filed March 16, 1953 (and now abandoned), for an invention entitled "Adjustable Loading Dock" and assigned to the assignee of this invention.

The frame 28 also includes a pair of T-shaped longitudinally extending rails 38 welded to the inner faces of the side plates 30 and extending substantially the full length of the side plates 30. At its inner end the frame is also provided with an apron 40 which has its inner edge attached to a mounting plate or bracket 42 by pins, bolts, or other suitable fasteners 44, the plate or bracket 42 being welded to the upper edge of the plate 32. The apron 40 has downwardly directed side flanges 46 which are coplanar with the vertical portions of the side frame members 30 and, when the loading dock ramp 10 is in the position shown in Fig. 2, the upper edges of the plates 30 lie close to the lower edges of the apron flanges 46. The apron is also provided with a plurality of depending reinforcing ribs 48 which are equidistantly spaced from each other and from the side flanges 46.

A second or inner frame 50 is slidably mounted within the first or outer frame 28 on the rails 38. The frame 50 comprises a pair of outwardly facing side channel members 52 interconnected at their inner or rear ends by an I-beam 54 and adjacent their outer ends by a tubular torque or torsion resisting member 56 which, as will appear hereinafter, also serves as the oil reservoir or tank for the hydraulic operating apparatus. A normally closed oil filling hole 57 is provided in the tank tube 56. A pair of longitudinally spaced shoes 58 is secured to the inner face of each of the side channel members 52 of the frame 50, and each shoe has a slot 60 therein to slide on the ways or rails 38. This structure permits the frame 50 to move freely inwardly and outwardly of the frame 28 while the latter pivots on the hinge members 36.

Ramp 62 of the loading dock ramp comprises a plurality of deck sections or leaves 64 of box construction having an inverted channel portion 66 with depending legs 68 interconnected by a lower plate 70. As seen in Fig. 3, the deck sections 64 are spaced slightly from each other to accommodate the reinforcing members 48 of the apron 40 therebetween. Each of the deck sections 64 is individually pivotally mounted to the I-beam 54 of the inner frame 50 on a pair of hinge members 72 projecting through slots 74 in the plate 70, so that each deck section 64 may move with respect to any other as well as relative to the frames 50 and 28 to accommodate unevenness in the truck bed or tilting of the truck bed due to weak springs on one side or the other or to uneven loading in the cargo space. The hinge members 72 are similar to the hinge members 36 and are of the type disclosed and claimed in the aforesaid copending application of Lawrence F. Jaseph, Serial No. 342,606.

At their outer ends the deck sections or leaves 64 rest on the tubular member 56 unless they are supported by the truck bed, and it will be noted from Fig. 3 that the legs 68 of each of the members lie on top of the tubular member 56 except that in addition the side sections 64 have their lower plates 70 lying on top of the upper flange of the channel 52.

At their very outer ends the deck sections 64 are constructed with tips 76 which are bent slightly downwardly and are adapted to enter the truck body and to rest upon the truck bed. Fig. 2 shows that the side flanges 68 stop short of the tips 76 which may be dropped over a sill on the truck bed at the doorway and yet have their outer ends rest on the truck bed to form a smooth path onto the ramp 62. The two side deck sections 64 have their outer side edges tapered or cut inwardly at 78 more readily to provide access to the interior of a truck.

The frames 28 and 50 are pivoted on the hinge members 36 by a jack 80 having a cylinder 82 and a piston 84 reciprocable therein. The lower end of the cylinder 82 is pivotally mounted by means of a pin 90 to a pedestal or base plate 86 secured by means of anchoring bars or members 88 in the concrete of the pavement or roadway 16. The upper and outer end of the plunger 82 is secured by a pivot pin 92 to a bracket or yoke 94 secured as by welding to the tubular member 56. Thus, when it is desired to raise the outer end of the ramp 62, fluid is admitted under pressure from the tank tube 56 to the cylinder 82 to move the plunger 84 outwardly. This will raise the outer ends of both frames and the ramp. Similarly, when the dock is to be lowered the cylinder 82 is vented to the tank tube 56 and the weight of the dock expels fluid from the cylinder.

A double acting jack 96 comprising a cylinder 98 and a connecting rod 100 secured to a piston 108 is interposed between the frames 28 and 50 and arranged so that when operated it slides the frame 50 on the frame 28 in the manner hereinbefore described. The cylinder 98 is pivotally secured by means of a pin 102 to the bracket or yoke 94 and, therefore, one end of the jack 96 is secured to the torque tube 56. The outer end of the piston rod 100 is pivotally secured by means of a pin 104 to a yoke or U-shaped bracket 106 mounted on one flange of an H-beam 108 or an I-beam lying on its side, the beam 108 extending between and welded to the side plates 30. Fluid under pressure can be admitted at either end and vented from either end of the jack cylinder 98 so that power can be exerted in both directions, first to move the frame 50 outwardly on the rails 38 and then to retract it.

When the frame 50 is in its advanced or outer position the gap between the inner end of the ramp 62 and the dock platform 14 is bridged by the apron 40 which is fixed to the frame 28 and overlies the inner ends of the deck sections 64.

Hydraulic fluid under pressure is supplied from the tube tank 56 to the cylinders 98 and 82 by a suitable hydraulic pump 110 which has its inlet connected to the tank 56 by a conduit 112 and its outlet connected to a check valve 114 by a conduit 116. A conduit 118 from the check valve 114 leads to a pair of branch conduits 120 and 122, the branch conduit 120 leading to a solenoid controlled valve 124, the outlet side of which is connected by a conduit 126 to the jack cylinder 82. When the outer end of the dock is to be raised, the pump 110 is operated and the solenoid controlled valve 124 is opened by energizing solenoid 124–U. This establishes an open passageway for the flow of hydraulic fluid from the tank 56 to the jack cylinder 82 and fluid under pressure is supplied to the cylinder 82 to raise the plunger 84 and the outer end of the dock. Lowering of the outer end of the dock is effected by opening solenoid controlled valve 128 which has its inlet port connected to the cylinder 82 by a conduit 130 and its outlet port connected to the conduit 112 by a conduit 132. Solenoid 128–D, when energized, opens this valve 128, and, the valve 124 being closed, the weight of the dock will cause the hydraulic fluid to be expelled from the cylinder 82 through the conduit 130, valve 128, and conduits 132 and 112 to the tank 56.

The in and out movement of the frame 50 and the deck 62 by the double acting jack 96 is under the control of a solenoid operated spring centered four-way valve 134, the inlet port 136 of which is connected to the branch conduit 122. When the deck 62 is to be advanced or moved outwardly, a solenoid 134–A is energized to shift the valve spool internally to connect the valve port 136 with a valve port 138. The port 138 is connected by a conduit 140 to a cylinder port 142 at the head end of the jack cylinder 98. At the same time, the valve drain port 144 which is connected to the conduit 132 by a conduit 146, is internally connected through the valve 134 with a port 148, the latter being connected to a cylinder port 150 at the rod end of the jack cylinder 98 by a conduit 152. Therefore, when hydraulic fluid under pressure is admitted to the head end of the cylinder 98, fluid from the rod end of the cylinder is expelled through the port 150, conduit 152, port 148, valve 134, port 144, and conduits 146, 132, and 112 to the tank 56.

The retraction movement of the deck 62 is accomplished by energizing a solenoid 134–R, which shifts the spool of the four-way valve 134 internally to connect the ports 136 and 148 and 144 and 138 so that hydraulic fluid under pressure will be supplied to the rod end of the cylinder 98 and expelled from the head end thereof to the tank 56.

The operation of the solenoids 124–U, 128–D, 134–A, and 134–R, and the operation of a pump motor 154, are under the control of an electric circuit which is diagrammatically shown in Fig. 5. Power is supplied from a three-phase source comprising lines 156, 158, and 160, and the current is properly distributed through a pair of multiple contact cam operated switches 162 and 164, each of the switches having four pairs of contacts, three pairs of which are used for selectively energizing the pump motor 154 and the other pair of which controls the proper energization of the valve controlling solenoids. The cams for each of the switches are indicated by the suffix letters A, B, C, and D, to the reference characters 162 and 164. It should be understood that drum switches or push button controls and relay actuated switches can be used in lieu of the cam operated switches, if desired. Also any suitable source of electric power may be used instead of the three-phase source illustrated.

The switches 162 and 164 are manually operable, and switch 162 controls the raising and lowering of the outer end of the dock, while the switch 164 controls the advance and retraction of the deck 62 and the frame 50.

When the switch 162 is turned to its "up" position, the following circuits are established: Line 156, switch 166, conductor 168, switch 170, conductors 172, 174 to the motor 154; line 158, switch 176, conductor 178, switch 180, conductors 182 and 184 to the motor 154; line 160, conductor 186, switch 188, conductors 190 and 192 to the motor 154; line 160, conductor 186, switch 194, conductor 196, solenoid 124–U, and conductor 198 to the line 158. The three-phase motor 154 is now energized to drive the hydraulic pump 110 and a fluid flow path is established through the solenoid controlled valve 124 which was opened upon energization of the solenoid 124–U, and therefore hydraulic fluid under pressure is supplied to the jack 80 to raise the outer end of the dock.

At the time these circuits are energized, a circuit from line 160, conductors 200 and 201, switch 202, conductor 204, safety switch 206, and through solenoid 128–D is opened. The safety switch 206 is mounted on the bracket 94 secured to the tank tube 56 and in such position that when the deck sections 64 at the center of the deck or ramp 62 rest on the tube 56, the switch 206 will be held in open position against the force of a switch closing biasing means such as a spring 208. When the switch 162 is moved to its neutral position, either manually or by a spring centering means, all of the circuits to the motor 154 will be opened, but the switch 202 will be closed. However, the circuit through the valve operating solenoid 128–D will remain open, because the deck sections 64 hold the switch 206 open.

With the dock in its raised position and a truck adjacent the dock in position to receive and support the outer end of the deck 62, the switch 164 is manually moved to the "out" position to close a series of circuits as follows: Line 156, switch 210, conductor 212, switch 214, and conductors 172 and 174 to the motor 154; line 158, switch 216, conductor 218, switch 220, and the conductors 182 and 184 to the motor 154; line 160, switch 222, conductor 224, switch 226, and conductors 190 and 192 to the motor 154; line 158, conductor 198, solenoid 134–A, conductor 228, switch 230, conductor 232, and conductor 200 to the line 160. The closing of these circuits energizes the motor 154 and the solenoid 134–A. The energization of solenoid 134–A shifts the valve 134 so that fluid will be supplied to the head end of the jack cylinder 98, and therefore the pump 110 supplies pressure fluid to move the piston 108 to the left as seen in Fig. 4, thereby moving the frame 50 and deck 62 outwardly on the frame 28. When the deck 62 has been advanced the requisite distance, the switch 164 is returned to its neutral position to break all of the circuits and deenergize the motor 154 and solenoid 134–A.

The upward and outward movement of the ramp can be effected simultaneously, but the ramp movements will be slower than if done as described because the output from the pump 110 will be divided between the jacks 80 and 96. It is, therefore, preferable that they be carried out sequentially.

The operator then moves the switch 162 to the "down" position, thereby closing a switch 234, operated by the cam 162–D, and which is connected by a conductor 236 to one side of the solenoid 128–D so that the latter is energized through the following circuit: Line 160, conductors 200 and 201, switch 234, conductor 236, solenoid 128–D, conductor 198, and line 158. The valve 128 is opened, and the weight of the dock moves the piston plunger 84 into the cylinder 82, expelling fluid therefrom to the tank 56 through the open valve 128.

When the deck sections 64 have their tips 76 supported on the truck bed, the switch 162 is moved to its neutral position to open the switch 234 and reclose the switch 202. However, when the tube 56 has moved away from the underside of the deck sections 64, the switch 206 is released and will be closed to complete the following circuit to the solenoid 128–D: Line 160, conductors 200 and 201, switch 202, conductor 204, switch 206, solenoid 128–D, conductor 198, and line 158. The valve 128 is held open to provide free communication between the jack cylinder 82 and the tank 56 permitting exchange of fluid therebetween, which allows the deck sections 64 to follow the tilt or movement of the truck bed as the case may be, and the tube 56 to hang below the deck 62.

There is a certain amount of lost motion between the inner frame 50 and the deck sections 64. This motion is limited by a stop member 238 having a shank 240 secured to one of the two center deck sections 64, and passing through a lug 242 carried by the tube 56. This lost motion is sufficient to accommodate any reasonable tilting of a truck bed, even that of several inches, but yet limits the amount of free fall of the outer end of the deck should at any time the truck be suddenly driven away from the dock before the deck is lifted from the truck bed and retracted. Should this happen, the deck 62 falls onto the tube 56 and contacts the operator for the switch 206 to open the latter and deenergize the solenoid 128–D. The valve 128 closes, and communication between the jack cylinder 82 and tank 56 is shut off, thereby preventing further free fall of the deck.

The orderly withdrawal and removal of the ramp 62 from the truck bed is accomplished by first operating the switch 162 to raise the deck end from the truck bed and then operating the switch 164 to its retracted or "in" position, which closes the previously described circuits to the pump motor 154. There is also closed a circuit including line 158, conductor 198, solenoid 134–R, conductor 244, switch 246, conductors 232 and 200, and line 160. Solenoid 134–R is energized to shift the four-way valve 134 so that fluid will be supplied to the rod end of the jack cylinder 98 and vented from the head end thereof. When the deck ramp 62 and frames 50 have been fully retracted, the switch 164 may be moved to its neutral position, breaking all of the circuits, and permitting the valve 134 to be centered, so that none of the fluid being expelled from the jack 80 can reach the jack 96. The switch 162 is then moved to its "down" position and the previously described circuits and operation of the hydraulic system will take place to permit the weight of the dock ramp to move it to its lowered position.

If desired the withdrawal of the ramp can be effected in a combination of movements by first raising the outer end of the ramp from the truck bed and then moving the switch 164 to the "in" position and the switch 162 to the "down" position. The ramp will then be drawn inwardly as its outer end moves downwardly. The switches 162 and 164 are moved to their neutral positions when the ramp 62 has been fully retracted and is level with the platform 14.

It is believed that it is unnecessary to set out a specific description of the operation of this dock as it is moved from its position shown in Fig. 2, to that in which it rests upon a truck bed, as such operation is believed readily understood from the description which was given on the electric control circuit shown specifically in Fig. 5.

When the ramp is in the Fig. 2 position, the deck or ramp 62 will be flush with the other and stationary portions of the dock 14, and will support traffic in the transverse position, particularly because of the rigidity afforded to the frame 50 by the torsion resisting tube 56. Therefore, it is unnecessary to supply any additional support for the outer end of the ramp other than the jack 80.

Fig. 6 illustrates a modified electric control for operating the valve solenoids which permits only vertical movement or only horizontal movement of the ramp 62 at any one time. In this figure the elements corresponding to those in Fig. 5 bear the same reference character.

The conductor 200 which is connected to the line 158 is connected to the switches 202 and 234 which are in parallel circuits, the switch 202 being connected in series with the safety switch 206 and solenoid 128–D by the conductor 204 and the switch 234 being connected in series with the solenoid 128–D by the conductor 236 which by-passes the safety switch 206. The switch 230 controlling the solenoid 134–A and the switch 246 controlling the solenoid 134–R are connected to the conductor 204 by a conductor 248.

Energization of either solenoid 134–A or solenoid 134–R requires the switch 202 to be closed as the circuits for these solenoids are from line 160, conductor 200, switch 202, conductors 204 and 248, switch 230, conductor 228, and solenoid 134–A, or switch 246, conductor 244, and solenoid 134–R, and conductor 198 to the line 158. The only time switch 202 is closed is when the "up" and "down" switch 162 is in neutral position. At all other times the switch 202 is open and no circuit through the four-way valve operating solenoids can be completed. Therefore, when hydraulic fluid is being supplied to or expelled from the jack 80, valve 134 is in its neutral position, at which time no internal communication is established between any of its valve ports, and the jack 96 cannot be operated. In all other respects a loading dock ramp equipped with the electric control of Fig. 6 operates in the same manner as one equipped with the controls of Fig. 5.

From the foregoing description it will be clear that the objectives which were claimed for this invention in the opening paragraphs of this specification are fully attained.

While preferred embodiments of the loading dock ramp constituting this invention have been shown and described, it will be apparent that further modifications and variations thereof may be made without departing from the underlying principles of the invention. It is, therefore, desired by the following claims to include within the scope of the invention all such variations and modifications by which substantially the results of this invention may be obtained through the use of the same or equivalent means.

What is claimed as new and desired to be secured by United States Letters Patent is:

1. In an adjustable loading dock ramp, a fixed support, a first generally rectangular frame pivotally mounted on said support, a second generally rectangular frame slidably supported by and positioned within said first frame and having a torsion resisting member adjacent its outer edge and arranged generally parallel to said fixed support to give substantial rigidity to said second frame, a plurality of deck sections each having one of its ends hinged to said second frame for pivotal movement relative thereto and adapted to be supported adjacent its other end on said member, said deck sections extending beyond both said frames and in the direction of sliding movement of said second frame, means connected to said torsion resisting member for pivoting said frames and deck sections relative to said fixed support and said frames relative to said deck sections when said other ends of said deck sections are supported on a truck bed or the like, and means connected between said torsion resisting member and said first frame for slidably moving said second frame and said deck sections relative to said first frame and said fixed support.

2. In an adjustable loading dock ramp, a fixed support, a first generally rectangular frame pivotally mounted on said support, a second generally rectangular frame slidably supported by and positioned within said first frame and having a torsion resisting member spaced from and generally parallel to said fixed support to give rigidity to said second frame, a plurality of deck sections, means pivotally mounting one end of each of said deck sections to said second frame adjacent said fixed support, said deck sections overlying said frames and extending beyond both said frames and in the direction of sliding movement of said second frame, a first expansible means having an anchored end and a movable end connected to said torsion resisting member and adapted to raise said frames and the outer ends of said deck sections sufficiently high to reach over a truck bed or the like, said frames being pivotally movable away from said deck sections whereby said deck sections may be supported solely by said frames adjacent said fixed support and the truck bed or the like, and a second expansible means acting between said torsion resisting member and a member of said first frame at the inner end thereof to slide said second frame and said deck sections on said first frame and away from and toward said fixed support.

3. In an adjustable loading dock ramp, a fixed support, a first frame pivotally mounted on said support, a second frame slidably supported by and positioned within said first frame and having a tubular torsion resisting member spaced from and generally parallel to said fixed support, a plurality of deck sections, means pivotally mounting one end of each of said deck sections to said second frame adjacent said fixed support, said deck sections overlying said frames and extending beyond both said frames and in the direction of sliding movement of said second frame, a hydraulic jack having an anchored end and a movable end connected to said tubular member and adapted to raise said frames and the outer ends of said deck sections sufficiently high to reach over a truck bed or the like, said frames being pivotally movable away from said deck sections whereby said deck sections may be supported solely by said frames adjacent said fixed support and the truck bed or the like, and a double acting hydraulic jack acting between said tubular member and a member of said first frame to slide said second frame and said deck sections on said first frame and away from and toward said fixed support.

4. In an adjustable loading dock ramp, a fixed support, a first generally rectangular frame pivotally mounted on said support, a second generally rectangular frame slidably supported by and positioned within said first frame and having a tubular hydraulic fluid storage tank providing, torsion resisting member adjacent its outer edge and generally parallel to said fixed support to give substantial rigidity to said second frame, a plurality of longitudinally extending deck sections each having one of its ends hinged to said second frame for pivotal movement relative thereto and adapted to be supported adjacent its other end on said tubular member, said deck sections extending beyond both said frames and in the direction of sliding movement of said second frame, first hydraulically operated expansible means connected to said tubular member for pivoting said frames and said deck sections relative to said fixed support and said frames relative to said deck sections when said other ends of said deck sections are supported on a truck bed or the like, second hydraulically operated expansible means connected between said tubular member and said first frame for slidably moving said second frame and said deck sections longitudinally relative to said first frame and said fixed support, a hydraulic pump having its inlet connected to said tubular tank member and its outlet connected to both said hydraulically operated expansible means, a plurality of electrically operated valve means interposed between said pump outlet and both said hydraulically operated expansible means, and manually operable electric circuit control means connected to said valve means for selectively operating said valve means thereby to effect pivotal and longitudinal movement of said deck sections relative to said fixed support.

5. The combination set forth in claim 4, wherein said electric circuit control means include a plurality of cam operated switching means for said electrically operated valve means.

6. The combination set forth in claim 4, wherein said electric circuit control means includes electrically interlocked switching means to prevent pivotal movement of the deck sections during longitudinal movement thereof and vice versa.

References Cited in the file of this patent

UNITED STATES PATENTS

| | | |
|---|---|---|
| 2,437,109 | Maquat | Mar. 2, 1948 |
| 2,449,639 | Cannon | Sept. 21, 1948 |
| 2,639,450 | Ramer | May 26, 1953 |
| 2,689,965 | Fenton | Sept. 28, 1954 |
| 2,714,735 | Watson | Aug. 9, 1955 |
| 2,731,892 | Simmonds | Jan. 24, 1956 |

OTHER REFERENCES

Freight Handling (pages 27 and 28) published by the Anglo-American Council on Productivity (July 1951).

Beacon Ramp Docks, by Beacon Machinery Inc., P.O. Box 188, East St. Louis, Missouri.

Publication, Rotary Leva-Dock, Brochute RE–402, by Rotary Lift Co., 1054 Kansas, Memphis 2, Tennessee.